United States Patent [19]

Crump et al.

[11] Patent Number: 4,466,835

[45] Date of Patent: Aug. 21, 1984

[54] CEMENT COMPOSITIONS CONTAINING SET RETARDERS

[75] Inventors: Druce K. Crump; David A. Wilson, both of Freeport, Tex.

[73] Assignee: The Dow Chemical Company, Midland, Mich.

[21] Appl. No.: 486,123

[22] Filed: Apr. 18, 1983

[51] Int. Cl.$^3$ .............................................. C04B 7/35
[52] U.S. Cl. ...................................... 106/90; 106/315
[58] Field of Search .................................. 106/90, 315

[56] References Cited

U.S. PATENT DOCUMENTS

| | | | |
|---|---|---|---|
| 3,346,487 | 10/1967 | Irani et al. | 106/90 |
| 3,346,488 | 10/1967 | Lyons et al. | 106/90 |
| 3,409,080 | 11/1968 | Harrison | 166/31 |
| 3,654,151 | 4/1972 | King et al. | 106/90 |
| 3,657,134 | 4/1972 | King et al. | 106/90 |
| 3,794,506 | 2/1974 | Schmidt et al. | 106/90 |
| 3,865,803 | 2/1975 | Falkehag | 260/124 A |
| 3,964,921 | 6/1976 | Persinski et al. | 106/90 |
| 4,040,854 | 8/1977 | Persinski et al. | 106/90 |
| 4,066,469 | 1/1978 | Shiel et al. | 106/89 |
| 4,225,361 | 9/1980 | Joseph | 106/111 |
| 4,401,473 | 8/1983 | Kleiner et al. | 106/109 |

OTHER PUBLICATIONS

Chem. Abstracts: 97, 112352a–"Plugging Composition for Cementing Oil and Gas Wells", Dytyuk, L. T. et al.
Chem. Abstracts: 97, 26178a–"Plugging Fluids for Cementing Deep Petroleum and Gas Wells", Alekseev, P. D. et al.
Chem. Abstracts: 98, 58912p–"Improvement of Casing Cementation in Deep and Ultradeep Wells, Part 2, Deep Well Cements and Additives," Arens, K. H. et al.
SU–640–019, "Plugging Mixture for High-Temperature Oil or Gas Wells–comprises Portland Cement and 1-Hydroxy Ethylidene-Phosphonic Acid Sodium or Potassium Salt", Khariv I Yu.
"Additives Tailor Cement to Individual Wells", P. N. Parker, C. Clement, *The Oil and Gas Journal*, Mar. 14, 1977, vol. 75.

*Primary Examiner*—James Poer
*Attorney, Agent, or Firm*—A. C. Ancora

[57] ABSTRACT

The process of employing as a cement setting retarder a compound which is a derivative of dicyclopentadiene bis(methylamine) wherein at least one amine hydrogen is substituted with a methylenephosphonic acid group or a salt thereof.

14 Claims, No Drawings

CEMENT COMPOSITIONS CONTAINING SET RETARDERS

BACKGROUND OF THE INVENTION

The invention pertains to aqueous hydraulic cement slurry compositions containing particular set retarders which are compounds derived from the bis(methylamine) of dicyclopentadiene.

Hydrophobic-substituted phosphonic or phosphinic acids and their alkali metal salts have been used in cements, primarily soil/cement mixtures, to improve the freeze-thaw properties and salt-resistance. Six- to eighteen-carbon alkyl phosphonic acids or their alkali metal salts are so described in U.S. Pat. No. 3,794,506. A plugging mixture for high temperature oil and gas wells comprising Portland cement and 1-hydroxy ethylidenephosphonic acid trisodium or tripotassium salts as set time extenders is described in Derwent abstract 71376B/39 (1979) of USSR Pat. No. 640,019. The use of these phosphonate salts at temperatures of 75° to 150° C. in amounts of 0.1–0.3% by weight is described in the abstract.

Other organic phosphorous acid derivatives are taught to be useful additives in cement compositions as turbulence-inducing and flow-property improver additives (U.S. Pat. Nos. 3,964,921 and 4,040,854, respectively). Another turbulence-inducer is a pyrolysis product of urea and a bis(alkylenepyrophosphate) (U.S. Pat. No. 3,409,080).

Alkylene diphosphonic acids and their water soluble salts are described as set time extenders and water reducing agents for gypsum plasters (U.S. Pat. No. 4,225,361). Lignins which have been phosphonoalkylated through an ether linkage or corresponding sulfonates, sulfides, hydroxyl or amine derivatives are taught to be useful primarily as dispersants or surfactants (U.S. Pat. No. 3,865,803) and are also said to be useful as "cement additives" without indicating specific uses.

Ultra-rapid hardening Portland cement compositions are described which contain various acid salt additives (U.S. Pat. No. 4,066,469). It states that use of acid phosphates as the acid salt additives is excluded since the phosphates have a characteristically powerful retarding property peculiar to them.

Most of the cement used in oil wells is called portland cement. Portland cement is manufactured by calcining raw materials consisting of limestone, clay, shale, and slag together at 2,600° to 2,800° F. in a rotary kiln.

The resulting material, is cooled and interground with small percentages of gypsum to form portland cement. In addition to the above raw materials, other components such as sand, bauxite, iron oxide, etc., may be added to adjust the chemical composition depending upon the type of portland cement desired.

The principal components of the finished portland cement are lime, silica, alumina, and iron. These components form the following complex compounds: Tricalcium aluminate, $(3CaO.Al_2O_3)$, tetracalcium aluminoferrite, $(4CaO.Al_2O_3.Fe_2O_3)$, tricalcium silicate, $(3CaO.SiO_2)$, and dicalcium silicate, $(2CaO.SiO_2)$.

When water is added to cement, setting and hardening reactions begin immediately. The chemical compounds in the cement undergo the processes of hydration and recrystallization which results in a set product. The maximum amount of water that can be used with an oil-well cement is the amount which can be added before solids separation occurs. The minimum amount of water is the amount required to make the slurry pumpable. Therefore, the normal water ratio is governed by the maximum and minimum limits for a particular class of cement.

Thickening time is the time that the cement remains pumpable in the well. This is the most critical property of an oil-well cement. The thickening time has to be long enough to be pumped into place and short enough to permit operations to resume quickly. Generally, 3 hours provides the necessary placement time plus a safety factor.

Other factors, such as fluid loss, viscosity and density must be taken into consideration and additives are known to the art-skilled which affect each of these factors as well as that of set, or thickening, time as mentioned above. Another parameter which has an effect on set time is temperature. Cement sets more rapidly as the temperature increases. This must be taken into consideration particularly when pumping cement into deeper wells since temperature increases as the depth of the well becomes greater. Temperature also affects the strength of the cement, the strength becoming less as the temperature increases.

Because of this temperature effect, it is important to retard the setting of the cement employed in the deeper wells.

It has now been discovered that certain new phosphonomethylated compounds are useful in aqueous cement slurries as set retarding additives. Some of these compounds are chelating agents, while others are useful as threshold agents in retarding the precipitation of metal ions from aqueous solution. However, not all such compounds are useful as cement set-retarders.

SUMMARY OF THE INVENTION

The products of the present invention useful as cement set retarders have the following formula:

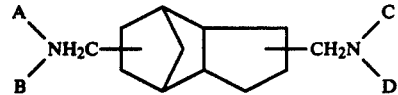

wherein A, B, C and D substituents are independently selected from hydrogen, $-CH_2PO_3H_2$, $-(CH_2)_nOH$ wherein n is 1 to 4, $CH_2CHOHSO_3H$, $CH_2CHOHCH_2SO_3H$, $-(CH_2)_nCOOH$ wherein n is 1 to 3 and the alkali metal, alkaline earth metal, ammonia and amine salts of the aforementioned phosphonic, sulfonic or carboxylic acids, providing that at least one of the above substituents is a methylenephosphonic acid group or a salt thereof.

DETAILED DESCRIPTION OF THE INVENTION

The compounds of the present invention which are useful as set retarders for cement are disclosed as new compounds in the application of one of us, filed simultaneously herewith and identified by the title "New Metal Ion Control Agents Based on Dicyclopentadiene Derivatives" (Docket No. C-30,199).

It has been determined that not all of the dicyclopentadiene bis(methylamine (DCPD-BMA) derivatives disclosed in the above-mentioned application are useful for the same purposes. Thus, only a limited few which contain at least one methylenephosphonic acid group will be effective as set retarders for cement. Even those which contain the methylenephosphonic acid group will be ineffective if certain other groups are present. Thus, for example the DCPD-BMA derivative which contains one methylenesulfonic acid group and three methylenephosphonic acid group does not retard the setting of cement under conditions of the test.

The method of making these compounds which are useful in retarding the setting of cement is well known and is disclosed in the above-mentioned co-filed application.

While the compounds so used must contain at least one methylenephosphonate group as a substituent of the amine nitrogen, certain other groups may be present. Thus, the remaining amine hydrogens may be unsubstituted. Substituents other than the methylenephosphonic group include alkanol radicals, wherein the alkyl group contains 1 to 4 carbon atoms; alkylcarboxylic acid radicals, wherein the alkyl group contains 2 to 4 carbons; hydroxyethyl- and hydroxypropylsulfonic acid radicals; and the alkali metal, alkaline earth metal, ammonia or amine salts of any of the above phosphonic, sulfonic or carboxylic acid groups.

The following test was used in determining whether a given compound was useful as a set retarding agent:
1. The following ingredients were weighed:
   cement—100 g
   water—38 g
   additive—0.2 g active
2. Water and liquid additive were mixed;
3. Cement was added to liquid, the bottle tightly closed and shaken to mix;
4. Bottle was placed in a pre-heated 180° F. bath;
5. Setting of cement was checked after 6 and 24 hours.

A blank (no additive) was run for comparison with each of the additives.

The following table shows the test results of those compounds indicated.

| Example No. | Substituents* | | | | Unset at | |
|---|---|---|---|---|---|---|
| | **A | B | C | D | 6 hrs. | 24 hrs. |
| 1 | MP | MP | MP | MP | Yes | Yes |
| 2 | MP | MP | MP | H | Yes | Yes |
| 3 | MP | MP | H | H | Yes | Yes |
| 4 | MP | MP | MP | HPS | Yes | Yes |
| 5 | MP | MP | HPS | HPS | Yes | Yes |
| 6 | MP | MP | MP | HE | Yes | Yes |
| 7 | MP | MP | HE | HE | Yes | Yes |
| 8 | MP | MP | MP | HP | Yes | Yes |
| 9 | MP | MP | HP | HP | Yes | Yes |
| 10 | MP | MP | SA | SA | Yes | Yes |
| 11 | MP | MP | MP | SP | Yes | Yes |
| 12 | MP | MP | MP | MS | Set | — |
| 13 | SA | SA | SA | SA | Set | — |
| 14 | SHPS | SHPS | SHPS | SHPS | Set | — |
| 15 | MP | MP | MS | MS | Set | — |

*HE = hydroxyethyl; HP = hydroxypropyl; MP = methylenephosphonic acid; HPS = hydroxypropylsulfonic acid; SA = sodium acetate; SP = sodium propionate; MS = methylenesulfonic acid; SHPS = sodium hydroxypropylsulfonate
**It should be understood that any one or more of the isomers of the compound indicated can be present, i.e. A, B, C and D substituents are interchangeable.

We claim:

1. In a process for retarding the setting of an aqueous cement slurry which comprises adding to said slurry an organic phosphonate, the improvement which comprises employing a compound of the formula

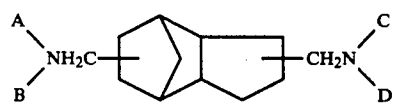

wherein A, B, C and D substituents are independently selected from hydrogen, —CH$_2$PO$_3$H$_2$, —(CH$_2$)$_n$OH wherein n is 1 to 4, CH$_2$CHOHSO$_3$H, CH$_2$CHOHCH$_2$SO$_3$H, —(CH$_2$)$_n$COOH wherein n is 1 to 3 and the alkali metal, alkaline earth metal, ammonia and amine salts of the aforementioned phosphonic, sulfonic or carboxylic acids, providing that at least one of the above substituents is a methylenephosphonic acid group or the salt thereof.

2. The process of claim 1 wherein the compound employed is the tetramethylenephosphonic acid derivative of dicyclopentadiene bis(methylamine) or a salt thereof.

3. The process of claim 1 wherein the compound employed contains three methylenephosphonic acid groups as substituents of dicyclopentadiene bis(methylamine) or a salt thereof.

4. The process of claim 1 wherein the compound employed contains two methylenephosphonic acid groups as substituents of dicyclopentadiene bis(methylamine) or a salt thereof.

5. The process of claim 3 wherein the trimethylenephosphonic acid derivative contains a hydroxypropylsulfonic acid group in place of the remaining amine hydrogen.

6. The process of claim 4 wherein the compound employed contains two hydroxypropylsulfonic acid groups in place of the remaining two amine hydrogens.

7. The process of claim 3 wherein the trimethylenephosphonic acid derivative contains a hydroxyethyl group in place of the remaining amine hydrogen.

8. The process of claim 4 wherein the compound employed contains two hydroxyethyl groups in place of the remaining two amine hydrogens.

9. The process of claim 3 wherein the trimethylenephosphonic acid derivative contains a hydroxypropyl group in place of the remaining amine hydrogen.

10. The process of claim 4 wherein the compound employed contains two hydroxypropyl groups in place of the remaining two amine hydrogens.

11. The process of claim 4 wherein the compound employed contains two sodium acetate groups in place of the remaining two amine hydrogens.

12. The process of claim 3 wherein the trimethylenephosphonic acid derivative contains a sodium propionate group in place of the remaining amine hydrogen.

13. The process of claim 1 wherein the temperature of the cement slurry is at least 180° F. (∼82° C.).

14. The process of claim 1 wherein the cement slurry is injected into an oil well.

* * * * *